United States Patent [19]

Nausedas

[11] Patent Number: 4,501,542
[45] Date of Patent: Feb. 26, 1985

[54] INTERNAL TUBE SUPPORT FOR CO-EXTRUSION STUFFING TUBE ASSEMBLY

[75] Inventor: Joseph A. Nausedas, Oak Forest, Ill.

[73] Assignee: Union Carbide Corporation, Danbury, Conn.

[21] Appl. No.: 567,245

[22] Filed: Dec. 30, 1983

[51] Int. Cl.³ .......................... B29F 3/04; A22C 7/00; A22C 11/00
[52] U.S. Cl. ..................................... 425/133.1; 17/32; 17/33; 99/450.7; 425/376 R; 425/462; 425/467
[58] Field of Search ................... 17/32, 33, 35, 40, 41; 99/450.7; 425/133.1, 376 R, 462, 467; 53/576

[56] References Cited
U.S. PATENT DOCUMENTS 2,501,690  3/1950  Prendergast ..................... 425/133.1
3,115,668  12/1963  Townsend ............................. 17/33
3,191,222  6/1965  Townsend ............................. 17/33
3,380,129  4/1938  Magruder ........................... 425/467
3,611,493  10/1971  Fogelberg et al. ................. 425/467
3,856,447  12/1974  Schiesser ......................... 425/133.1
4,082,488  4/1978  Brinkschröder et al. ........... 425/461

FOREIGN PATENT DOCUMENTS 2450063  9/1980  France .

OTHER PUBLICATIONS

Anon., Viscora-Flash, #36(1976).

Primary Examiner—Willard E. Hoag
Attorney, Agent, or Firm—Dale Lynn Carlson

[57] ABSTRACT

An internal tube support for a co-extrusion stuffing tube assembly of the coaxial tube type.

18 Claims, 7 Drawing Figures

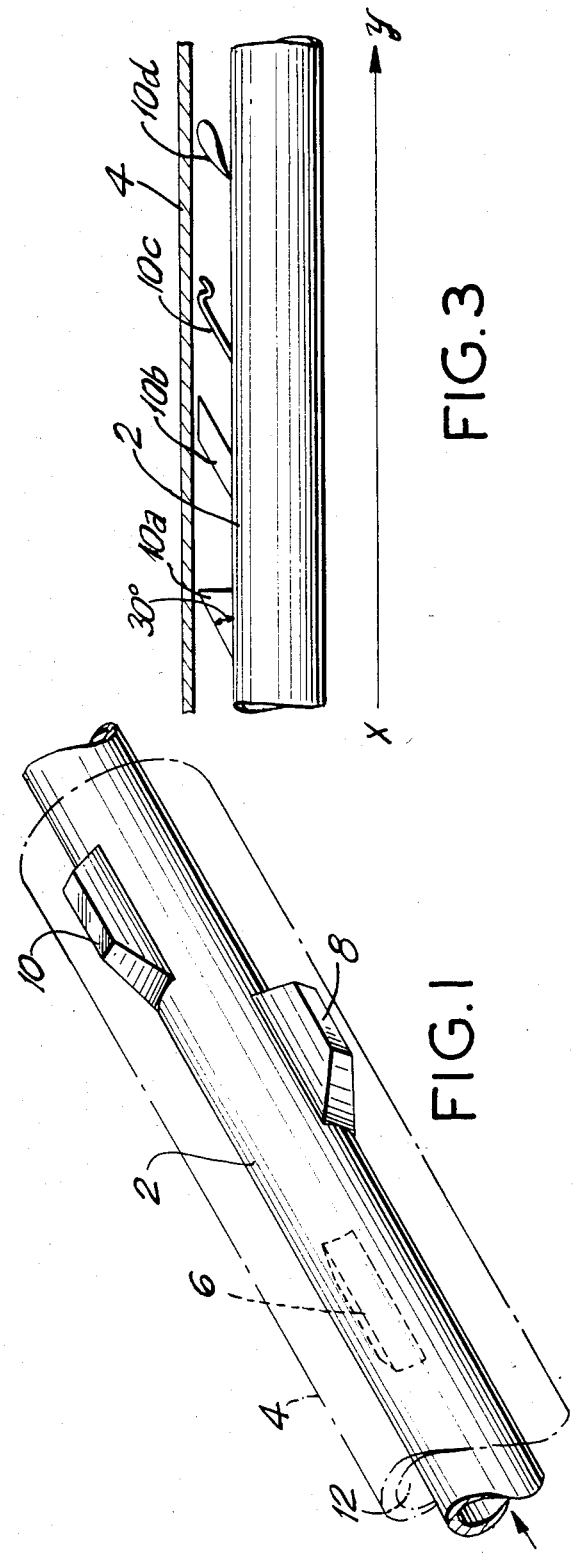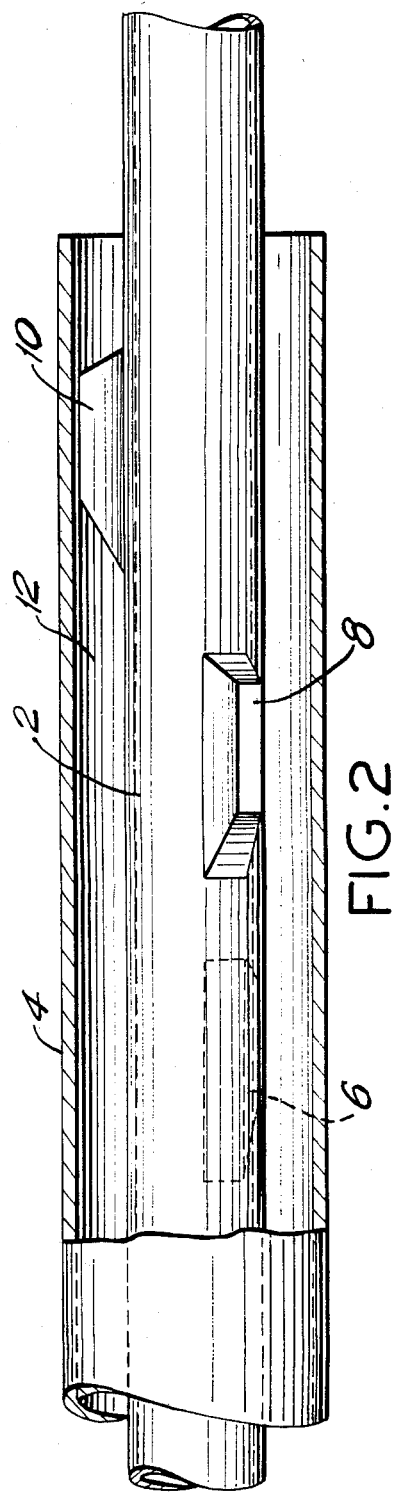

INTERNAL TUBE SUPPORT FOR CO-EXTRUSION STUFFING TUBE ASSEMBLY

FIELD OF THE INVENTION

The present invention relates generally to co-extrusion of encased food product and, more specifically, to an internal tube support for a co-extrusion stuffing tube assembly of the co-axial tube type.

BACKGROUND OF THE INVENTION

Machines for processing sausages or frankfurters in an automatic and continuous manner using shirred casing sticks are well-known in the art. Particularly successful versions thereof from a commercial standpoint are the FRANK-A-MATIC machines, described in U.S. Pat. Nos. 3,115,668 and 3,191,222, incorporated herein by reference.

Adaptation of the FRANK-A-MATIC machine to accommodate co-extrusion of meat product, particularly meat emulsion and condiments such as cheese, mustard or ketchup, is described in VISCORA-FLASH publication #36 (1976) at pages 8 and 11. Co-extrusion is a relatively recent commercial development in meat processing technology whereby frankfurters can be made having a core of condiment, thereby eliminating the inconvenience and mess associated with the consumer's having to add condiment at the time of eating the frankfurter.

The condiment should be centered in the frankfurter core in order to minimize or avoid leaking of the condiment from the meat mass. Although not specifically discussed in connection with the FRANK-A-MATIC machine, a general system for centering an inner condiment tube inside the meat product outer tube to accommodate co-extrusion is described in the Viscora-Flash publication. The publication teaches the use of steel pins, as shown at page 9 thereof to achieve "perfect centering" of the inner tube inside the outer tube.

The above-described "perfect centering" system has disadvantages, however, inasmuch as meat fibers have the tendency to be caught by the steel pins, resulting in a clogging of the outer tube after accumulation of the meat fibers at the pins over a period of time.

French patent publication No. 2,450,063 discloses one possible solution to the above mentioned clogging problem by using bends in the inner tube, instead of steel pins, in order to effect "perfect centering" of the inner tube within the outer tube of a stuffing tube assembly. However, this solution would be expected to cause clogging problems at the point of contact between the inner and outer tube.

In view of the commercial importance of the above-discussed co-extrusion machines, new assemblies are needed.

OBJECT OF THE INVENTION

It is an object of the present invention to provide an internal tube support which centers an inner tube within an outer tube of a stuffing tube assembly, and which minimizes the tendency of clogging by meat fibers or other food product during co-extrusion of meat product and condiment.

SUMMARY OF THE INVENTION

The present invention relates to an apparatus for co-extruding an elongated food product having a central core formed of one food product and a second food product circumscribing said core, said apparatus comprising a first supply source to feed one food product to a first extrusion tube, and a second supply source to feed said second food product to a second extrusion tube coaxially mounted around the first tube; the improvement comprising at least two ramped spacing means spaced from each other either radially or radially and longitudinally along said extrusion tubes, and being positioned in an annulus formed by said extrusion tubes, each of said spacing means being in contact with only one of said first and second extrusion tubes, thereby facilitating a controlled eccentric movement between the axis of said tubes at their discharge ends in order to minimize clogging of said second food product at said spacing means.

BRIEF DESCRIPTION OF THE DRAWING

FIG. 1 is a perspective view of a co-axial tube end of a co-extrusion stuffing tube assembly showing three trapezoidal spacing means.

FIG. 2 is a partial sectional view of a co-extrusion stuffing tube assembly showing three trapezoidal spacing means.

FIG. 3 is a schematic view of a co-extrusion stuffing tube assembly showing various ramped spacing means configurations.

DETAILED DESCRIPTION OF THE INVENTION

Figure 4:
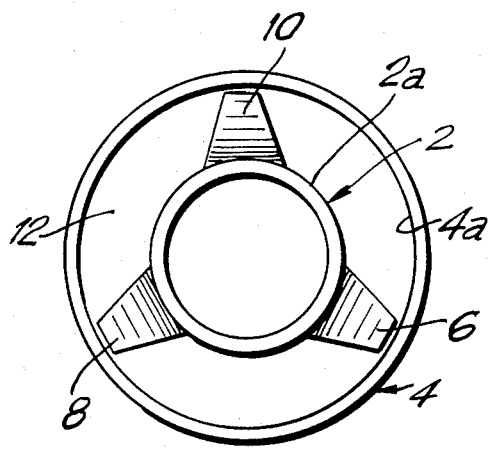
FIGS. 4-7 are end views of various co-extrusion stuffing tube assemblies showing alternate configurations for trapezoidal spacing means.

As illustrated in FIGS. 1 and 2, the condiment inner tube 2 is maintained in a substantially centered position inside meat product outer tube 4 by virtue of trapezoidally shaped spacing means 6, 8 and 10 disposed in annular space 12 between the outer wall of inner tube 2 and the inner wall of outer tube 4. The trapezoidally shaped spacing means 6, 8 and 10 serve to provide a substantial centering of said inner tube 2 inside said outer tube 4 while allowing the inner tube 2 limited "play" or controlled radial movement with respect to tube 4. This movement makes it possible for a meat fiber or other food product particle to pass through annulus 12 without becoming stuck at or about spacing means 6, 8 and 10 by means of a controlled eccentric movement of the inner tube within the outer tube. In addition, the taper on spacing means 6, 8 and 10 forms a ramp which helps to minimize the accumulation of food particles or fibers and the possibility of obstruction of annulus 12 at the spacing means. By using the ramped co-axial tube spacing assembly shown in FIGS. 1 and 2, the possibility of clogging of annulus 12 is minimized.

Variations of the system shown in FIG. 1 are possible and well within the scope of the present invention. For example, the trapezoidal shaped spacing means 10 shown in FIGS. 1 and 2 could be replaced with other ramped spacing means such as triangular shaped means 10a, a trapezoidally shaped spacing means 10b, "squiggle" shaped spacing means 10c or "teardrop" shaped spacing means 10d, ramped in the direction of food product flow from x to y in FIG. 3. The spacing means should be ramped at an angle of from 20° to about 40° off the axis of the stuffing tubes, and preferably at an angle of about 30°, to minimize the possibility of clogging annulus 12.

Spacing means 6, 8 and 10 may be suitably adapted to either the outside surface of the inner tube or to the inner surface of the outer tube as desired. The spacing means should be dimensioned to provide sufficient centering effect while leaving room for controlled radial movement of inner tube 2 within annulus 12. The spacing means can be rigid or flexible and are suitably constructed of metal (such as steel or spring steel wire), rigid or flexible plastics (e.g. nylon, polypropylene), and the like. The spacing means may be either solid or hollow. "Ramped" or "tapered" spacing means, as used herein, is intended to designate that the spacing means be ramped or tapered in the direction of food product flow in order to minimize or completely avoid obstructing the flow thereof. Generally, each of the spacing means should be in contact with (i.e., adhered to) only one of the coaxially mounted extrusion tubes, and there should be at least machine clearance between the spacing means and the other extrusion tube.

Figure 5:
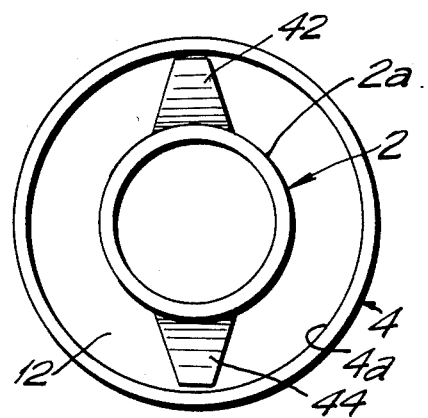
Figure 6:
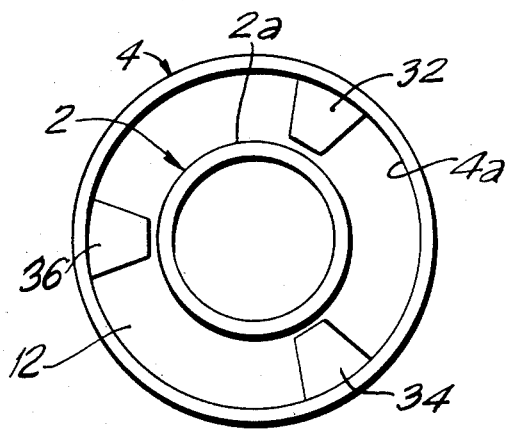
Figure 7:
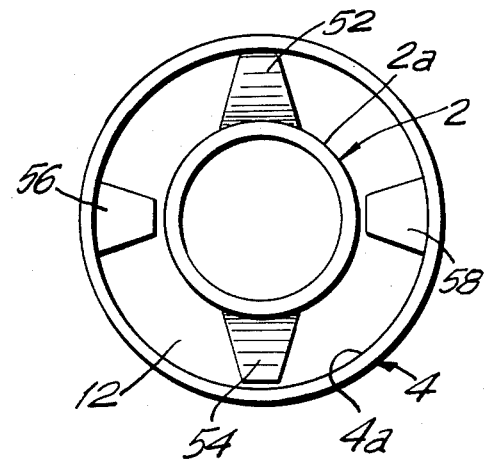

FIGS. 4 to 7 show end views of various stuffing tube assemblies showing alternate configurations for the trapezoidal spacing means. The spacing means can be displaced either radially or both radially and longitudinally along the surface of one or both extrusion tubes with each spacing means being in contact with, and affixed to, only one extrusion tube. FIG. 4 shows spacing means 6, 8 and 10 displaced 120° apart and affixed to outer surface 2a of inner tube 2. FIG. 5 shows spacing means 42, 44 displaced 180° apart and affixed to outer surface 2a of inner tube 2. FIG. 6 shows spacing means 32, 34, 36 displaced 120° apart and affixed to inner surface 4a of outer tube 4. FIG. 7 shows spacing means 52, 54, 56, 58 displaced 90° apart and with spacing means 52 and 54 affixed to outer surface 2a of inner tube 2 and with spacing means 56 and 58 affixed to inner surface 4a of outer tube 4.

Variations of the above-described stuffing tube assemblies are deemed to be within the full spirit and scope of the present invention.

The following example is intended to illustrate, but in no way limit, the present invention.

EXAMPLE

A co-axial tube assembly for producing ten-to-the-pound hot dogs was designed in accordance with the present invention as follows: In this system, a ¼ inch o.d., 3/16 inch i.d. stainless steel condiment tube and an ½ o.d. outer tube was employed using three trapezoidally shaped means, each ramped at a 30° angle off the axis of the stuffing tubes and radially spaced and mounted on the inner tube, with one spacing means being located 1¼ inch from the exit end of the outer tube.

The inside diameter of the outer tube was 0.437 inch and the clearance between each spacing means and the outer tube was 0.037 inches when the inner tube was centered within the outer tube.

While the preferred embodiments of this invention have been disclosed hereinabove, those skilled in the art will appreciate that changes and modifications may be made therein without departing from the spirit and scope of the invention.

I claim:

1. In an apparatus for co-extruding an elongated food product having a central core formed of one food product and a second food product circumscribing said core, said apparatus including a first supply source to feed one food product to a first extrusion tube, and a second supply source to feed said second food product to a second extrusion tube coaxially mounted around the first tube; the improvement comprising at least two ramped spacing means spaced from each other radially or both radially and longitudinally on a surface of said extrusion tubes, and being positioned in an annulus formed by said extrusion tubes, each of said spacing means being in contact with only one of said first and second extrusion tubes, one of said tubes having a mounting such as to allow centering of the inner tube within the outer tube while allowing for a controlled eccentric movement of the inner tube within the outer tube in order to minimize clogging of said second food product at said spacing means.

2. The apparatus of claim 1 wherein at least one of said ramped spacing means is mounted on the outside surface of the inner tube.

3. The apparatus of claim 1 wherein at least two of said ramped spacing means are mounted on the outside surface of the inner tube.

4. The apparatus of claim 1 wherein at least one of said ramped spacing means is mounted on the inside surface of the outer tube.

5. The apparatus of claim 1 wherein at least two of said ramped spacing means are mounted on the inside surface of the outer tube.

6. The apparatus of claim 1 wherein said ramped spacing means are trapezoidally shaped.

7. The apparatus of claim 1 wherein said ramped spacing means are constructed of a rigid material.

8. The apparatus of claim 1 wherein said ramped spacing means are constructed of a flexible material.

9. The apparatus of claim 1 wherein said ramped spacing means are radially spaced on said first or second extrusion tube, or a combination thereof, at an angle of 90° apart from each other.

10. The apparatus of claim 1 wherein said ramped spacing means are radially spaced on said first or second extrusion tube, or combination thereof, at an angle of 120° apart from each other.

11. The apparatus of claim 1 wherein said ramped spacing means are radially spaced on said first extrusion tube at an angle of 180° apart from each other.

12. The apparatus of claim 1 wherein said ramped spacing means have a triangular shape.

13. The apparatus of claim 1 wherein said ramped spacing means have a tear-drop shape.

14. The apparatus of claim 1 wherein at least two of said ramped spacing means are mounted on the inside surface of the outer tube and wherein at least two of said ramped spacing means are mounted on the outside surface of the inner tube.

15. The apparatus of claim 1 wherein said ramped spacing means are radially spaced on said first or second extrusion tube at an angle of 120° apart from each other.

16. The apparatus of claim 15 wherein said flexible material is steel.

17. The apparatus of claim 14 or 15 wherein said ramped spacing means are constructed of plastic.

18. The apparatus of claim 14 or 15 wherein said ramped spacing means are constructed of steel spring.

* * * * *